_United States Patent Office_  3,687,819
Patented Aug. 29, 1972

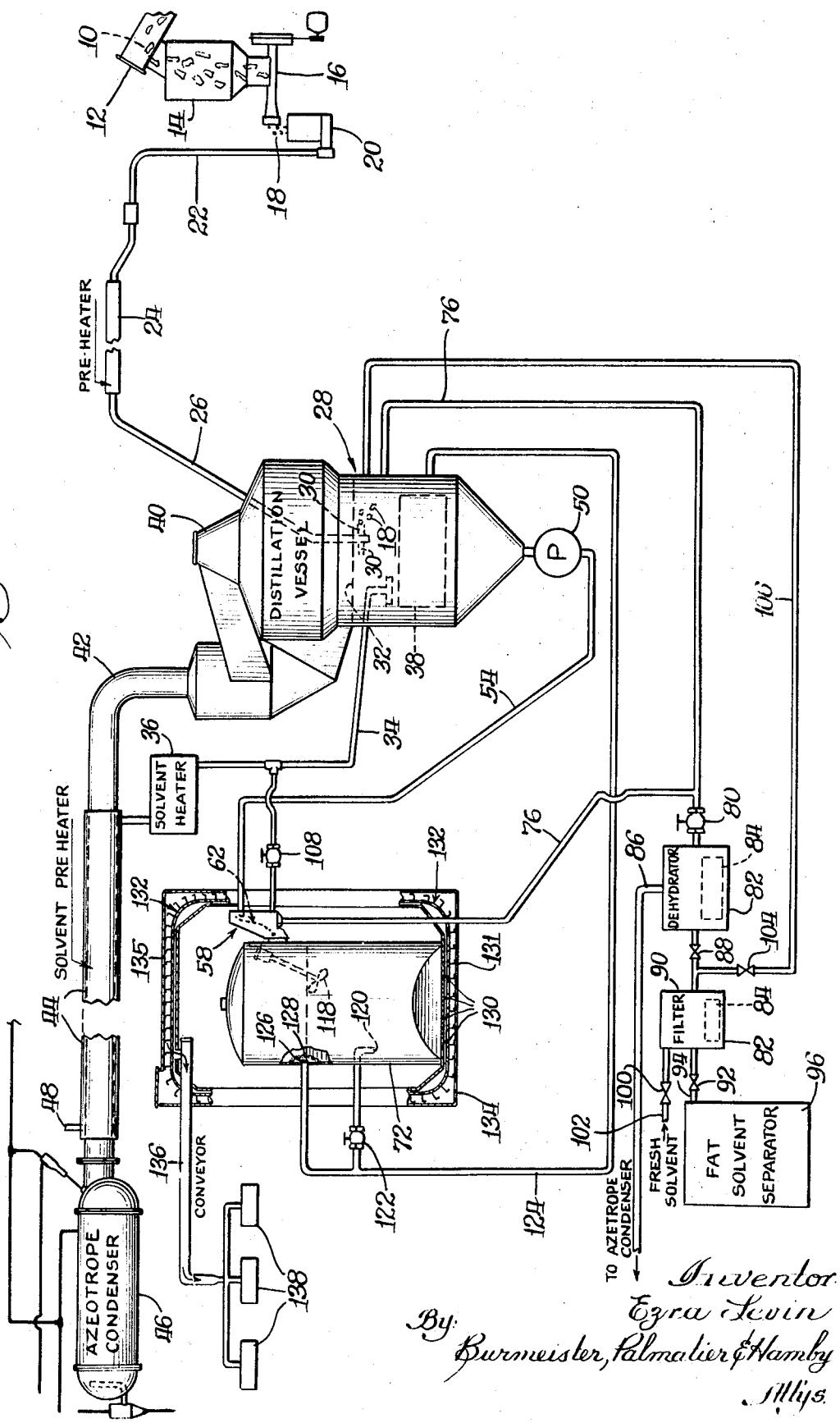

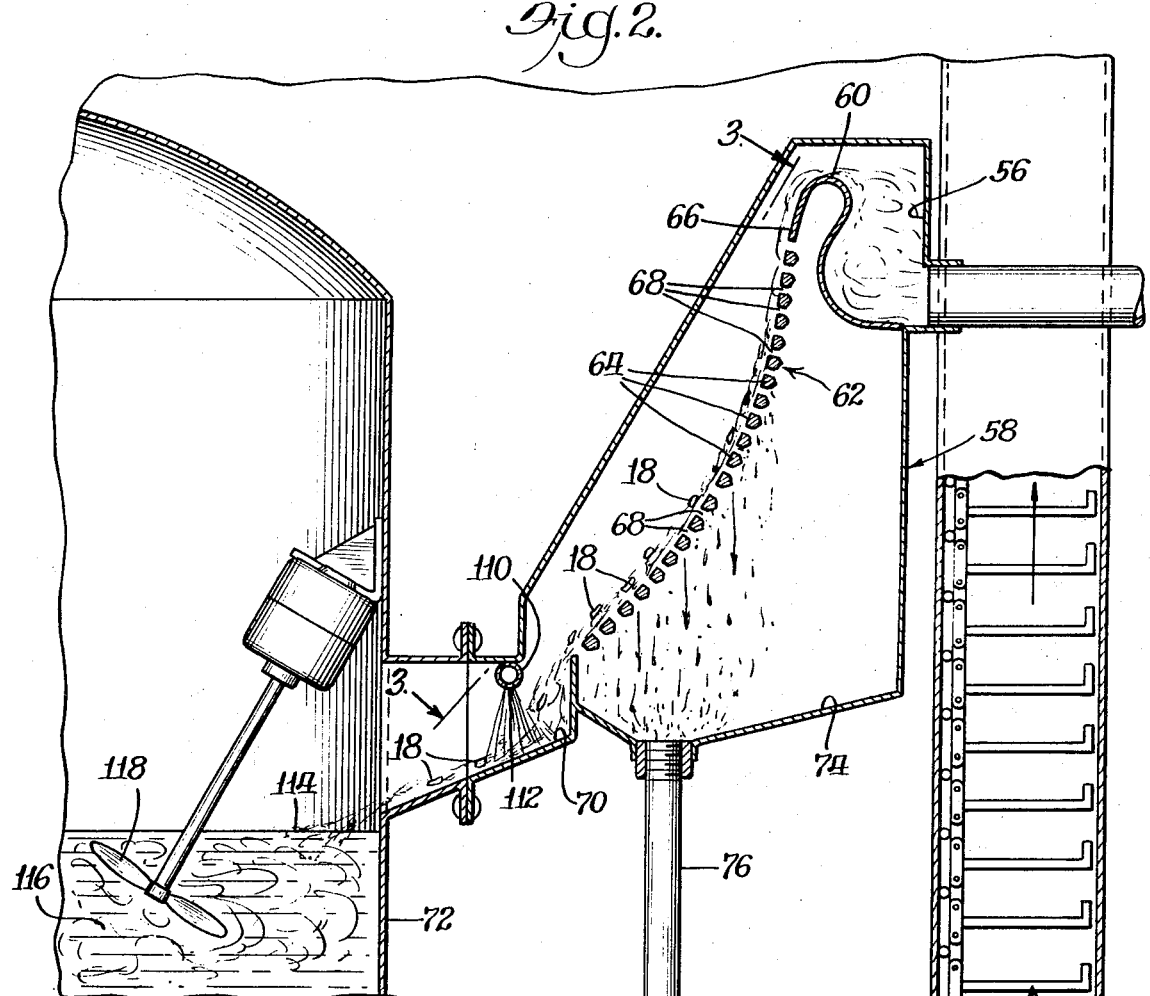
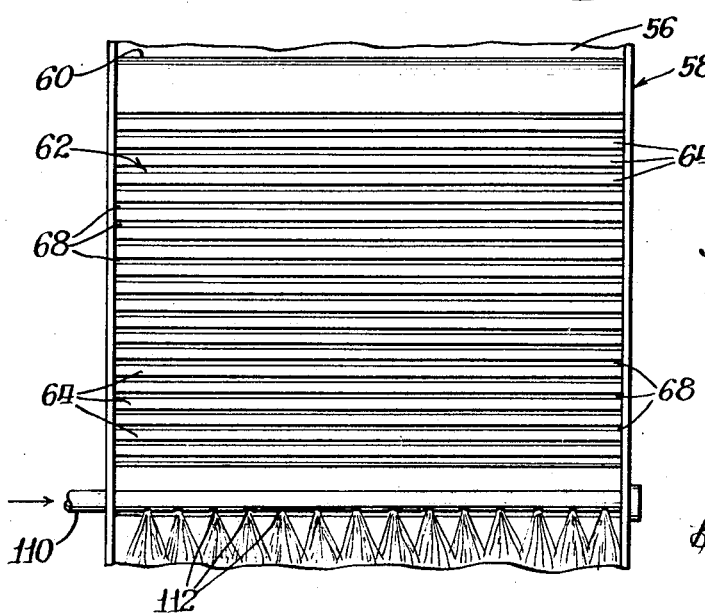

3,687,819
PROCESS AND APPARATUS FOR PRODUCING FAT AND NUTRITIOUS DEFATTED SOLIDS FROM FATTY BIOLOGICAL MATERIAL CONTAINING WATER
Ezra Levin, Champaign, Ill., assignor to VioBin Corporation, Champaign, Ill.
Filed Apr. 3, 1970, Ser. No. 25,422
Int. Cl. A23b 1/04; B01d 3/36; C11b 1/10
U.S. Cl. 203—47                                    11 Claims

ABSTRACT OF THE DISCLOSURE

A process and apparatus for dehydrating and defatting fish, slaughterhouse offal, and other fatty biologoical materials containing water to produce fat and a palatable nutritious solids residue. The fatty biological material is fragmentized and continuously introduced into a distillation vessel with ethylenedichloride or other suitable fat solvent which unites with the water content of the material to form a low boiling azeotrope that is distilled off. Solids fragments dehydrated and defatted in the distillation vessel are continuously removed hydraulically by recirculation of fluid between the vessel and an external screen from which the solids move into a washing and settling vessel for finish cleaning of fat by clean solvent. Clean solids settling in the washing vessel are mechanically removed. Liquid effluent from the screen is returned to the distillation vessel, a portion of the effluent being bled off and further heated in a dehydration vessel to dry the residue of solids entrained therein whereupon the effluent from the dehydration vessel is filtered to remove the dried solids and subsequently processed to separate the fat and solvent constituents of the filtered liquid.

---

This invention relates to a new and improved process and apparatus for removing fat and water from fatty biological tissue which includes as one of its constituents a substantial quantity of water. The principal end products produced are fat and dehydrated and defatted solids that constitute a highly nutritious food which is highly resistant to spoilage even when stored over a long period.

These highly valuable food products are produced by the technology which is the concern of this invention from raw biological tissue such, for example, as slaughterhouse offal, trash fish, coconut tissue and the like which in their unprocessed state have little market value. Some of such materials that can be transformed by this technology into highly valuable foodstuffs have been regarded in their unprocessed state as being unfit for consumption. Wastage of such biological materials has not been uncommon on account of the cost and impracticality of preserving and preparing the materials for consumption using conventional methods.

The present invention is concerned with the dehydration and defatting of such biological material by means of a solvent which combines with the water in the material to form an azeotrope that is distilled off and which combines with fat in the material to form a fluent miscella that is separated from the dehydrated and defatted solid residue of the biological material, the miscella being further processed to separate the fat and solvent. The processing of biological materials in this manner to produce fat and dehydrated and defatted solids which are palatable and nutritious offers many present and great potential advantages.

The technology previously developed for this purpose is the subject of much previous effort and prior inventions exemplified, for example, by U.S. Pat. No. 2,619,425; U.S. Pat. No. 2,503,312; U.S. Pat. No. 2,840,459; and pending U.S. patent application Ser. No. 408,231 filed Nov. 2, 1964 now Pat. No. 3,538,973.

Even though the methods and apparatus developed and used previously for this purpose embody the best efforts and ingenuity of those working in the field, the apparatus and equipment required and used were nevertheless expensive and inherently have had a mode of operation and a finite productive capacity that have intrinsically limited the degree to which the cost of production could be reduced and complicated operating procedure and added to maintenance costs.

One object of the invention is to provide an improved process and apparatus which materially reduces, in relation to prior practice, the cost, size and complexity of the equipment required to process by means of a solvent wet biological material to produce fat and a defatted and dehydrated solids residue of palatable nutritious quality.

Another object is to provide an improved method and apparatus by which biological material containing a substantial quantity of water is dehydrated and defatted in a boiling bath of solvent in a distillation vessel or cooker into which the biological material is physically introduced and from which processed fragments of the material are removed hydraulically by recirculation of liquid between the distillation vessel and a solids separator so that an optimum concentration of solids is maintained in the fluid within the vessel and an optimum saturation of solvent with fat is achieved with consequent maximization of operating efficiency.

A further object is to provide an improved method and apparatus as recited in the preceding objects in which fragments of the biological material subjected to dehydration and defatting in the distillation vessel are removed from the vessel and separated from the fluid by recirculation of the fluid between the vessel and a screen, thus obviating the necessity for removing the material from the vessel mechanically and obviating the necessity for concentrating the fragments of biological material in the distillation vessel to expedite mechanical removal of the material from the vessel.

Another object is to provide an improved method and apparatus as recited in the preceding objects which achieves a most efficient and thorough dehydration and defatting of the biological material while at the same time effecting a highly efficient collection and removal of the processed material from the dehydrating and defatting fluid using a compact assemblage of apparatus of significantly minimized size.

Another object is to provide an improved method and apparatus as recited in which processed fragments of the biological material, removed from the distillation vessel by repeated recirculation of fluid from the distillation vessel over a screen, are finish washed by clean solvent in a manner that makes for efficient collection and separation of the processed solids from the fluid while at the same time maintaining boiling conditions within the distillation vessel which achieve a most efficient removal of water and fat from the biological material by the solvent within the distillation vessel.

Other objects and advantages will appear from the following description of the invention in conjunction with the accompanying drawings, in which:

FIG. 1 is a schematic illustration, partially sectioned, of apparatus provided by the invention for practicing the method of the invention;

FIG. 2 is a fragmentary sectional view on an enlarged scale of a portion of the apparatus appearing in the left central portion of FIG. 1; and FIG. 3 is a sectional view on a reduced scale taken generally with reference to the line 3—3 of FIG. 2.

As previously indicated, the method and apparatus of this invention recovers fat and produces palatable nutritious solids, highly valuable foodstuffs, from biological tissue such, for example, as slaughterhouse offal, trash fish, meat and fish scrap and coconut or other plant tissue of edible characteristics such as may be suitable for processing by the method and apparatus provided.

For economic reasons, the advantages of the method and apparatus provided are maximized by using low cost raw materials of the character recited. However, it will be appreciated that aside from factors of cost, similar materials of higher grade can be processed if desired.

Having reference to FIG. 1, the wet biological material to be processed, in this instance fish denoted by the number 10, is fed by a conveyor 12 into the hopper 14 of a grinder 16 or other suitable fragmentizing machine which fragmentizes the material into multitudinous small fragments 18 that are discharged into a pressure feeding machine or pump 20 of suitable construction which forces the fragmentized biological material through a supply line 22 to a preheater 24.

The moving fragments 18 of biological material pass through the preheater 24 and continue through a supply line 26 to flow substantially continuously into a distillation vessel or cooker 28 through a plurality of outlets 30 within the vessel.

Upon entering the distillation vessel 28, the fragments of biological material are immersed immediately in a bath of fluent fat solvent, denoted generally in FIG. 1 by the number 32.

The fluent fat solvent 32 itself is substantially water immiscible and combines with the water constituent of the biological material to form an azeotrope that has a boiling point substantially below that of the pure solvent. Water-immiscible fat solvents suitable for this purpose are well known in the relevant prior art as exemplified by the aforementioned patents and application. A preferred solvent for this purpose is ethylene dichloride which boils under standard atmospheric pressure at 83° C. and forms with water an azeotrope having a boiling point under standard atmospheric pressure of 71.5° C. Another example of a suitable solvent is heptane, having a boiling point of 98.4° C. under standard atmospheric pressure and forming with water an azeotrope which boils at 79.5° C. under standard atmospheric pressure. Other suitable solvents include propylene dichloride, trichlorethylene and perchlorethylene.

In general the solvent used should have a boiling point below 120° C. under standard conditions and must not be reactive with the biological material being processed under the operating conditions of the method used and must be capable of being separated by evaporation from the fat removed by the solvent from the biological material without leaving harmful or toxic residues. Suitable chlorinated solvents may include the bromine, iodine or fluorine derivatives of aliphatic hydrocarbons. The hydrocarbon fat solvents include benzene, hexane, toluene, cyclohexane, and heptane.

The fragmentized biological material continuously entering the distillation vessel 28 forms with the fluent solvent 32 a fluent slurry which is heated to and caused to boil at the boiling temperature of the azeotrope formed by the fat solvent and water removed from the material by the solvent. As will presently appear, this effects a distilling off of azeotrope from the slurry.

Heat for this purpose is supplied to the distillation vessel in the present instance in two ways. Incoming solvent in sufficient quantity to supplant solvent being removed from the distillation vessel 28, as will presently appear, is continuously supplied to the distillation vessel in a very hot state through a solvent supply line 34, leading from a solvent heater 36. Additional heat is continuously supplied to the distillation vessel by heating panels 38 immersed in the slurry within the distillation vessel and heated by steam.

In the boiling bath of slurry maintained in the distillation vessel by the continuous introduction of fragmentized biological material and the continuous introduction of solvent, the solvent acts on the fragmentized biological material to extract water rapidly from the substance of such material and to dissolve the fat constituent of the material.

The water extracted from the material and the solvent form together an azeotrope in proportions determined by the intrinsic properties of the solvent and having a boiling point substantially below that of the solvent itself. Because of its lower boiling point the azeotrope of water and solvent is distilled off from the boiling slurry.

The vaporous azeotrope is collected by a collector 40 surmounting the distillation vessel 28 and directing the azeotrope in a vaporous state through a large pipe 42 to pass through a heat exchanger or solvent preheater 44 which serves the dual functions of cooling the vaporous azeotrope and preheating solvent which is passed through the solvent preheater 44 to the previously mentioned solvent heater 36 where the solvent is further heated before flowing through the line 34 to the distillation vessel as previously described. The azeotrope emerging from the solvent preheater 44 in a somewhat cooled condition enters an azeotrope condenser 46 where it is condensed to a liquid state for subsequent processing in a conventional manner to remove the water constituent and provide clean solvent for storage as expedient and reintroduction into the process through the solvent preheater 44 which has a solvent inlet 48 as shown.

The solvent in the distillation vessel 28, which is not distilled off with water in the form of an azeotrope forms with fat dissolved by the solvent from the biological material a miscella which, together with the fragments of biological material being processed, constitute a fluent slurry.

The bottom of the distillation vessel 28 is tapered downwardly as shown and connects with the intake of a recirculating pump 50 which continuously withdraws fluent slurry at a controlled rate from the boiling bath within the distillation vessel. The continuous flow of slurry into the pump 50 is made up of solvent, a miscella of solvent and fat, and entrained particulate solids 18, FIG. 2, formed by fragments of biological material subjected to dehydration and defatting by the solvent in the boiling bath within the distillation vessel.

The pump 50 discharges the continuous flow of slurry, including entrained solids, through a line 54 to the intake or distribution box 56 of a solids separating or screening unit 58 having, as shown, an external relation to the distillation vessel 28 and being located above the level of the surface of the boiling liquid within the distillation vessel.

The slurry with entrained solids entering the box 56, FIGS. 2 and 3, continuously overflows a horizontally elongated weir 60 and cascades down over a screen, denoted generally by the number 62, formed by a plurality of spaced parallel bars 64 having a pattern in profile, illustrated best in FIG. 2, which curves downwardly and forwardly from the lip 66 from which the slurry overflowing the weir 60 descends onto the screen 62 of spaced bars 64.

The horizontally elongated spacings or interstices 68 between successive bars 64 of the screen 62 allow passage therebetween of the fluent vehicle of the slurry, the spacings 68 being sufficiently narrow to preclude passage of the major portion of the entrained solids which tumble down the front or outer face of the pattern of parallel bars 64 to the lower edge of the screen 62 from which the solids descend onto an inclined underlying ramp 70 along which the solids slide downwardly into a solids washing and settling vessel 72.

In the preferred construction, the front faces of the screen bars 64 along which the solids slide downwardly are substantially flat, the width of the horizontal spaces 68 between successive bars being dimensioned as previously described to allow passage therethrough of the liquid vehicle with a minimized entrainment of solids in the liquid passing through the screen.

The liquid effluent passing through the screen is caught by an underlying collector 74 of the screen unit 58 to flow out by gravity through a discharge line 76. For convenience and consistency, the particulate solids descending down the screen 62 onto the ramp 70 are denoted in FIG. 2 by the same number 18 applied to the biological material fragments entering the distillation vessel 28 and being withdrawn hydraulically by the pump 50 in the fluid vehicle as described.

A screen 62, of the character described, provided by those specifically skilled in the design of screens is effective for reducing to 5% the solids content of the effluent passing through the screen 62 and descending through the drain line 76. At the same time, the material held back by the screen 62 and caused to descend from the bottom of the screen onto the inclined ramp 70 can be of the order of 95% solids.

The major portion of the liquid effluent passing through the screen 62 together with the residuum of entrained solids not removed by the screen are recirculated back into the drain line 76 which is connected as shown to discharge back into the distillation vessel. This recirculation of liquid effluent from the screen back into the distillation vessel can take place by gravity flow, the screen unit 58 preferably being above the level of the surface of boiling bath in the distillation vessel as described.

The return of the major portion of the liquid effluent from the screen 62 to the distillation vessel 28 as described functions in cooperation with the continuous pumping of liquid and entrained particles from the bottom of the distillation vessel to the external screen 62 by the pump 50 to complete continuous recirculation of liquid between the boiling bath within the distillation vessel and the external screen to achieve a removal of processed solids 18 from the distillation vessel by a purely hydraulic action, the processed solids being entrained in the continuous stream of liquid circulated from the distillation vessel through the external screen as described. This hydraulic removal of the processed solid fragments from the boiling bath within the distillation vessel obviates any necessity for use of mechanical means to collect and remove such processed solids from the distillation vessel as the process progresses.

At the same time, it obviates any necessity for concentration of the solid fragments in the slurry within the distillation vessel 28 in order to facilitate mechanical removal of such solids. As a consequence of the hydraulic removal of the solids from the distillation vessel through the circulation of liquid as described, the solids can be kept suspended in the liquid within the distillation vessel at a concentration level which is optimum for efficient dehydration and defatting of the solid fragments. Moreover, the removal of the solids by hydraulic recirculation of fluid through the distillation vessel aids in avoiding coating of or the accumulation of solids on the interior surfaces of the distillation vessel such as tended to occur previously where there has been a concentration of the solids to aid mechanical removal of the solids from distillation vessels or cookers into which the raw biological material is introduced.

As previously indicated, the fat constituent of the fragmentized biological material is dissolved from the residual solid portion of the material fragments by the solvent agitated within the distillation vessel 28 by the boiling vapors of azeotrope. The fat thus removed from the biological material is dissolved or otherwise entrained in the solvent to form a miscella which together with the solvent is circulated from the distillation vessel by the pump 50 through the screen 62 as described, the fat remaining as a constituent of the liquid effluent passing through the screen out the drain line 76 as described.

Just as solids are continuously removed hydraulically from the distillation vessel, fat is continuously removed from the distillation vessel by bleeding off a minor portion of the liquid effluent from the screen 62. Such effluent flowing through the drain line 76 and containing a residuum of solids passing through the screen, which, as indicated, may be of the order of 5%, is fed through a regulator valve 80 into a dehydrator 82 wherein the bled off portion of effluent from the screen is heated by a heater 84 to a temperature materially in excess of the temperature of the boiling bath 32 within the distillation vessel 28.

At the elevated temperature within the dehydrator 82, the unsaturated solvent becomes even more active and further dehydrates the entrained solids to assure their complete dryness and cleans up the solids within the dehydrator of any previously undissolved fatty constituent. Vapor emerging from the liquid heated to the higher temperature within the dehydrator 82 is collected and carried off through a pipe 86 leading to a suitable condenser, such as the condenser 46, for condensing the azeotropic and solvent vapors in the vaporous mix.

By way of example and assuming that ethylene dichloride is being used as a solvent in the processing of fish, the dehydrator 82 can be operated at a temperature of approximately 183° F. while the distillation vessel 28 previously described is being operated at a temperature of approximately 161° F. In other words, the distillation vessel is operated at the boiling point of the azeotrope formed by water and ethylene dichloride while the dehydrator 82 is heated to a much higher temperature approximating the boiling point of the pure solvent. The result is to assure vaporization of substantially the last vestiges of any moisture in the residual solids entrained in the liquid effluent from the screen 62 entering the dehydrator, the temperature of the dehydrator being in excess of the boiling point of the azeotrope formed by solvent and any remaining moisture in the solids.

It is noteworthy, however, in conjunction with this assured boiling off of the last vestiges of moisture from the solids to achieve a complete drying of the solids that the temperature of the dehydrator 82 nevertheless remains far below the 212° F. boiling point of the water itself. Thus, the process and apparatus function in processing the biological material at temperatures well below the boiling point of pure water, thus avoiding the deleterious effects which high temperatures could otherwise have on the end products.

The liquid heated to the higher temperature within the dehydrator 82, wherein the entrained solid fragments are dried and cleaned of any remaining fat by the accelerated action of the solvent within the dehydrator, is continuously passed from the dehydrator through an outlet valve 88 through a filter 90 which filters the dried and defatted residual solids from the fluent miscella of solvent and fat. The entrained solids, by virtue of the assured completion of defatting and drying within the dehydrator 82 will not clog the filter 90 as the filtrate passes from the filter 90 through an outlet valve 92 into a discharge line 94 leading to fat solvent separating apparatus 96 indicated schematically in FIG. 1. Fat solvent separating apparatus suitable for this purpose and functioning to recover the fat constituent from the solution and provide cleaned solvent for storage and reintroduction into the process as desired is well known in the art and need not be specifically described here.

Periodically, as for example at 8-hour intervals, the filter 90 is reverse flushed with clean solvent to remove from the filter the accumulation of dried and defatted solid particles strained by the filter from the miscella flowing therethrough to the fat and solvent separating apparatus 96. Such reverse flushing of the filter 90 can be effected by closing the inlet and outlet valves 88, 92 for miscella and opening a valve 100 to connect a supply line 102 of fresh solvent under pressure to the filter 90 and by opening a valve 104 on the inlet side of the filter to connect the filter temporarily to a line 106 leading back into the distillation vessel 28. The filter 90 is in this manner quickly flushed clean of collected solids which are returned with the washing solvent back into the distillation vessel 28 where such solids are caught up in the liquid vehicle continuously circulating through the distillation vessel and carried once again to the solids removing screen 62 as described. The filter 90 cleaned, the valves 100, 104 are closed and the valves 88, 92 are opened to restore the normal flow of fluid through the filter.

Referring now to FIGS. 2 and 3, the mass of material flowing off the lower edge of the screen 62 onto the inclined ramp 70 and being constituted approximately 95% by the processed solids 18 and about 5% by liquid is washed from the inclined ramp 70 into the previously mentioned solids washing and settling vessel 72 to which the ramp is adjoined as shown. Such flushing of the solids from the ramp 70 into the vessel 72 is effected by clean, hot solvent from the previously mentioned solvent heater 36 which is caused to flow through a regulator valve 108 into a flushing pipe 110, FIGS. 2 and 3, extending across the ramp 70 and having outlets 112 positioned to direct streams of hot solvent against the solids flowing onto the ramp.

The solids and clean solvent admitted to the washing and settling vessel 72 fill the vessel to a predetermined level 114, FIG. 2, disposed somewhat below the ramp 70 yet being at the same time above the upper level of the boiling bath within the distillation vessel 28 so that liquid can flow by gravity from the washing vessel 72 back to the distillation vessel 28 as will be described.

The upper portion of the body 116, FIG. 2, of solvent and immersed solids in the vessel 72 is agitated by a power driven agitator or propeller 118 mounted to extend into the upper portion of the fluent body 116 as shown.

The washing and settling vessel 72 is unheated except for the heat admitted by the introduction of the hot solvent from the heater 36 and the heat in the solids flowing from the screen 62. As a consequence, the liquid within the washing and settling vessel 72 does not boil. When ethylene dichloride is used as a solvent and the distillation vessel 28 is maintained at an approximate temperature of 161° F. as mentioned, the washing and settling vessel 72 may operate at a temperature of 150° F.

Even though the fluid within the washing and settling vessel 72 does not boil and is maintained at a temperature less than that within the distillation vessel 28, the solvent admitted to the washing and settling tank or vessel 72 and agitated in contact with the solids admitted to the vessel 72 from the screen 62 functions to complete removal from the solids fragments of any residual residue of fat on the solids and any residuum of moisture that may be in the solids. This desired cleaning of residual fat and moisture from the solids particles is achieved by virtue of the very low quantities of fat and moisture present in the solids admitted to the vessel 72 from the screen 62 and by virtue of the clean condition of the solvent present as contrasted to the condition of the solvent in the distillation vessel, which in a relative sense is much more saturated with dissolved fat. In the washing and settling vessel 72, the volume of solvent present can be kept quite high in relation to the quantities of water and fat that need be cleaned from the processed solids admitted from the screen 62, while at the same time making feasible use of a washing and settling vessel 72 having a size much minimized to advantage in relation to the size of the distillation vessel 28. For example in an installation in which the distillation vessel 28 has a capacity of 6,000 gallons, the washing and settling vessel 72 can have a capacity of 3,000 gallons. In such an installation, the dehydrator 82, previously described, can have a capacity of 600 gallons.

The previously processed solid fragments 18 sliding from the ramp 70 into the upper region of the body of fluent mixture 116 in the vessel 72, which is agitated by the turning propeller 118, is finished cleaned of fat and dried by the clean solvent whereupon the washed and cleaned fragments of solid settle into the relatively stagnant lower portion of the washing and settling vessel 72.

To keep the solvent within the washing vessel 72 clean, solvent is withdrawn from the medial portion of the vessel through a downwardly open outlet 120 located within the vessel medially between the top and bottom of the fluent body 116 within the vessel. Fluid entering the outlet 120 flows by gravity to the distillation vessel 28 through a regulator valve 122 and a line 124, the valve 122 normally being adjusted so that the rate of discharge through the outlet 120 is slightly less than the rate at which fresh solvent is admitted into the vessel 72. More particularly, the outlet regulator valve 122 is adjusted so that the fluent body 116 within the vessel 72 is maintained at a predetermined level by continuously overflowing through an overflow outlet 126 shielded by a screen 128 and discharging into the line 124 leading to the distillation vessel.

Solid fragments finish cleaned by the fresh solvent agitated in the upper portion of the vessel 72 progressively settle into the bottom of the vessel, this settling of the cleaned solids being expedited by the fact that the liquid body, except for the mechanically agitated upper portion, is generally stagnant and conducive to settling, there being no boiling of liquid within the vessel 72 such as would impede settling of the washed particles which have a specific gravity somewhat greater than that of the solvent.

The bottom of the washing and settling vessel 72 is progressively narrowed downwardly to discharge the cleaned solids which settle in the vessel through openings 130 in the bottom of the vessel 72 onto the lower run 131 of an endless runaround conveyor denoted generally by the number 132. The conveyor 132 extends upwardly into overlying relation to the vessel 72 being enclosed within a fluid-tight case 134 which extends upwardly above the level of liquid within the vessel 72.

Solids settling to the bottom of the vessel 72 are picked up by the conveyor 132 and carried to an upper run 135 of the conveyor where the solids are discharged onto a horizontally extending conveyor 136 which carries the cleaned solids to a battery of driers or desolventizers 138 constructed in a manner well known in this art and functioning to remove the last vestiges of solvent from the defatted an dried solids so that such solids, constituting a residue of the fragmentized biological material introduced into the apparatus and processed in the manner described, become a palatable and nutritious food.

It will be appreciated that by virtue of the recirculation of fluid between the distillation vessel 28 and the solids separating unit 58, which returns solvent repeatedly to the distillation vessel after passing through the solids screen 62, the concentration or ratio of solids relative to liquid in the vessel 28 can be maintained at an optimum level for defatting and dehydration of the solids and the solvent can be loaded to an optimum degree of saturation with fat before being drawn off through the dehydrator 82, preparatorily to separating the fat and solvent from each other.

The invention is claimed as follows:

1. The process of producing fat and nutritious defatted and dehydrated solids from fatty biological material having a substantial moisture content, comprising, fragmentizing the biological material into multitudinous fragments, providing in a distillation vessel a bath of liquid solvent capable of removing water from the biological material and forming therewith an azeotrope and capable of removing fat from the biological material and forming therewith a fluent mixture of fat and solvent, introducing the fragmentized biological material in a generally continuous manner into the solvent bath within the distillation vessel to form a fluent slurry therein, continuously boiling the slurry within the vessel to distill off azeotrope formed by the solvent and water removed from the biological material by the solvent, collecting and condensing the azeotrope distilled off from the distillation vessel, continuously flowing a stream of slurry from the distillation vessel to an external screen and directing such stream against the screen to separate from the fluid vehicle of the slurry a major portion of the entrained solids which are residues of the biological material fragments immersed in the solvent bath, returning generally continuously to the boiling bath within the distillation vessel the major portion of the liquid effluent from the screen along with the residuum of residue solids entrained in such liquid effluent, directing generally continuously into a dehydrator a minor portion of the liquid effluent from the screen along with the residuum of residue solids entrained in such liquid effluent, heating the liquid within the dehydrator to further dehydrate and defat the residuum of residue solids immersed therein and directing the liquid and entrained residue solids from the dehydrator through a filter to filter the residue solids from the liquid which constitutes a separable mixture of solvent and fat, directing residue solids from the screen into the upper portion of a solids washing and settling vessel, supplying generally continuously clean solvent to the washing and settling vessel to form therein a washing bath of solvent into which residue solids from the screen are immersed to be washed and allowed to settle therein, agitating the upper portion of the washing bath in the washing and settling vessel, continuously removing from the washing and settling vessel residue solids which settle therein, and flowing solvent and dissolved fat from the washing and settling vessel to the distillation vessel to add solvent to the liquid bath in the latter vessel into which the fragmentized biological material is introduced for dehydration and defatting.

2. The process of producing fat and nutritious defatted and dehydrated solids from fatty biological material, in accordance with claim 1, including periodic cleansing of the filter of collected residue solids by flowing clean solvent through the filter in a direction generally counter to the normal direction of flow therethrough and directing the solvent and entrained solids gleaned from the filter to the distillation vessel.

3. The process of claim 1 in which the solvent used is ethylene dichloride.

4. The process of producing fat and nutritious defatted and dehydrated solids from fatty biological material having a substantial moisture content, comprising, fragmentizing the biological material into multitudinous fragments, providing in a distillation vessel a bath of liquid solvent capable of removing water from the biological material and forming therewith an azeotrope and capable of removing fat from the biological material and forming therewith a fluent mixture of fat and solvent, introducing the fragmentized biological material into the solvent bath within the distillation vessel to form a fluent slurry therein, continuously heating the slurry within the vessel to distill off azeotrope formed by the solvent and water removed from the biological material by the solvent, collecting and condensing the azeotrope distilled off from the distillation vessel, flowing astream of slurry from the distillation vessel to a screen and directing such stream against the screen to separate from the fluid vehicle of the slurry a major portion of the entrained solids which are residues of the biological material fragments immersed in the solvent bath, returning to the heated bath of slurry within the distillation vessel a portion of the liquid effluent from the screen along with the residuum of residue solids entrained in such liquid effluent; segregating a portion of the liquid effluent from the screen along with the residuum of residue solids entrained in such liquid effluent for further processing to separate the solvent, fat, and solids constituents thereof; directing residue solids from the screen into the upper portion of a solids washing and settling vessel, supplying clean solvent to the washing and settling vessel to form therein a washing bath of solvent into which residue solids from the screen are immersed to be washed and allowed to settle therein, maintaining the washing bath of solvent in the washing and settling vessel at a temperature below boiling so that the washing bath does not boil, continuously removing from the washing and settling vessel residue solids which settle therein, and flowing solvent and dissolved fat from the washing and settling vessel to accommodate fresh solvent in the washing and settling vessel.

5. The process of producing fat and nutritious defatted and dehydrate solids from fatty biological material having a substantial moisture content, comprising, fragmentizing the biological material into multitudinous fragments, providing in a distillation vessel a bath of liquid solvent capable of removing water from the biological material and forming therewith an azeotrope and capable of removing fat from the biological material and forming therewith a fluent mixture of fat and solvent, introducing the fragmentized biological material into the solvent bath within the distillation vessel to form a fluent slurry therein, continuously heating the slurry within the vessel to distill off azeotrope formed by the solvent and water removed from the biological material by the solvent, collecting and condensing the azeotrope distilled off from the distillation vessel, flowing a stream of slurry from the distillation vessel to a solids separator and separating therein from the fluid vehicle of the slurry a major portion of the entrained solids which are residues of the biological material fragments immersed in the solvent bath, returning to the heated bath of slurry within the distillation vessel a portion of the effluent from the solids separator from which residue solids have been removed, segregating a portion of the liquid effluent from the solids separator for the recovery of solids and fat from such effluent, directing residue solids from the solids separator into the upper portion of a solids washing and settling vessel, supplying clean solvent to the washing and settling vessel to form therein a washing bath of solvent into which residue solids from the solids separator are immersed, washed and allowed to settle; removing from the washing and settling vessel residue solids which settle therein, and flowing solvent and dissolved fat from the washing and settling vessel to accommodate fresh solvent in the washing and settling vessel.

6. The process of producing fat and nutritious defatted and dehydrated solids from fatty biological material having a substantial moisture content, comprising, fragmentizing the biological material into multititudinous fragments, providing in a distillation vessel a bath of liquid solvent capable of removing water from the biological material and forming therewith an azeotrope and capable of removing fat from the biological material and forming therewith a fluent mixture of fat and solvent, continuously introducing the fragmentized biological material into the solvent bath within the distillation vessel to form a fluent slurry therein, continuously heating the slurry within the vessel to distill off azeotrope formed by the solvent and water removed from the biological material by the solvent, collecting and condensing the azeotrope distilled off from the distillation vessel, continuously recirculating the liquid bath between the distillation vessel and a solids separator and separating from the liquid passing through the separator a large portion of the entrained solids which are residues of the biological material fragments immersed in the solvent bath, segregating a portion of the liquid effluent from the solids separator for the recovery of solids and fat from such effluent, continuously directing residue solids from the solids separator into the upper portion of a solids washing and settling vessel; supplying clean solvent to the washing and settling vessel to form therein a washing bath of solvent into which residue solids from the solids separator are immersed, washed and allowed to settle; maintaining the washing bath of solvent in the washing and settling vessel at a temperature below boiling so that settling of solids is undisturbed by boiling, continuously removing from the washing and settling vessel residue solids which settle therein, and flowing solvent and dissolved fat from the washing and settling vessel to accommodate fresh solvent in the washing and settling vessel.

7. The process of producing fat and nutritious defatted and dehydrated solids from fatty biological material having a substantial moisture content, comprising, fragmentizing the biological material into multitudinous fragments, providing in a distillation vessel a bath of liquid solvent capable of removing water from the biological material and forming therewith an azeotrope and capable of removing fat from the biological material and forming therewith a fluent mixture of fat and solvent, introducing the fragmentized biological material in a generally continuous manner into the solvent bath within the distillation vessel to form a fluent slurry therein, continuously boiling the slurry within the vessel to distill off azeotrope formed by the solvent and water removed from the biological material by the solvent, collecting and condensing the azeotrope distilled off from the distillation vessel, continuously flowing a stream of slurry from the distillation vessel to a solids separating unit to separate from the fluid vehicle of the slurry a major portion of the entrained solids which are residues of the biological material fragments immersed in the solvent bath, returning generally continuously to the boiling bath within the distillation vessel a portion of the liquid effluent from the solids separating unit along with the residuum of residue solids entrained in such liquid effluent, directing generally continuously into a dehydrator a portion of the liquid effluent from the solids separating unit along with the residuum of residue solids entrained in such liquid effluent, heating the liquid within the dehydrator to further dehydrate and defat the residuum of residue solids immersed therein, continuously removing liquid and dehydrated residue solids entrained therein from the dehydrator for recovery of fat and solvent, directing residue solids from the solids separating unit into a solids washing and settling vessel; supplying generally continuously clean solvent to the washing and settling vessel to form therein a washing bath of solvent into which residue solids from the screen are immersed, washed and allowed to settle; continuously removing from the washing and settling vessel residue solids which settle therein, and flowing solvent and dissolved fat from the washing and settling vessel to accommodate therein fresh washing solvent.

8. An apparatus for producing fat and nutritious defatted and dehydrated solids from fatty biological material having a substantial moisture content, comprising, a distillation vessel adapted to contain a boiling body of liquid solvent, solvent heating means connected to said distillation vessel to supply hot solvent thereto, biological material fragmentizing means positioned to produce and supply fragmentized biological material substantially continuously to said distillation vessel to be immersed within a body of solvent therein, said distillation vessel having heating means for transferring heat to a body of solvent therein to effect boiling of such body, vapor collecting means surmounting said distillation vessel to collect azeotropic vapors distilled from the body of solvent boiled within the distillation vessel, a condenser connected with said azeotrope collecting means to condense azeotropic vapors collected by the latter, a screen positioned externally to said distillation vessel at a location above the normal liquid level within the latter, said screen comprising multitudinous spaced parallel bars disposed in a tier having a downwardly and forwardly curved profile, a weir surmounting said spaced parallel bars to discharge liquid thereonto and an intake box disposed alongside said weir, a pump connected between the lower portion of said distillation vessel and said intake box to pump liquid and entrained solids continuously from said distillation vessel to said intake box to overflow said weir and cascade downwardly over said bars to pass the liquid effluent through the spacings between the bars and to sluice entrained solids over the bars and off the lower edge of the screen formed thereby, liquid collecting means underlying said screen and connected with said distillation vessel to return to the latter liquid effluent passing between said bars, said collecting means being disposed above the liquid level in said distillation vessel, a dehydration vessel interconnected with said liquid collecting means associated with said screen to receive a portion of the effluent passing through the screen, means connected with said dehydration vessel to heat the liquid contents thereof to effect drying of fragmentary solids entrained in liquid therein, a filter connected with said distillation vessel to receive fluid heated in the latter and to filter entrained solids therefrom, a solids washing and settling vessel positioned adjacent said screen to receive solids cascaded downwardly over said bars, a source of clean hot solvent connected to said washings and settling vessel to continuously supply clean hot solvent thereto to maintain therein a body of solvent into which solids from said screen are immersed for drying and washing, liquid conduit means connecting said washing and settling vessel with said distillation vessel to continuously flow solvent to the latter from said washing and settling vessel to determine the upper level of the liquid body in the washing and settling vessel and to accommodate the continuous addition of clean solvent to such liquid body, agitating means coacting with said washing and settling vessel to continuously agitate the upper portion of the liquid body in the latter, a conveyor connected with the bottom of said washing and settling vessel to receive fragmentary solids settling therein and extending upwardly to discharge the solids at a level above the upper level of the liquid body in the washing and settling vessel for further processing.

9. An apparatus for producing fat and nutritious defatted and dehydrated solids from fatty biological material having a substantial moisture content, comprising, a distillation vessel adapted to contain a boiling body of liquid solvent, solvent heating means connected to said distillation vessel to supply hot solvent thereto, biological material fragmentizing means positioned to produce and supply fragmentized biological material substantially continuously to said distillation vessel to be immersed within a body of solvent therein, said distillation vessel having heating means for transferring heat to a body of solvent therein to effect boiling of such body, vapor collecting means coacting with said distillation vessel to collect azeotropic vapors distilled from the body of solvent boiled within the distillation vessel, a condenser connected with said azeotrope collecting means to condense azeotropic vapors collected by the latter, a screen positioned externally to said distillation vessel, flow means connected between said distillation vessel and said screen to continuously flow liquid and entrained solids from said distillation vessel to the screen to screen entrained solids from the flowing liquid, liquid collecting means coacting with said screen and connected with said distillation vessel to return to the latter liquid effluent passing through the screen, a dehydration vessel interconnected with said liquid collecting means to receive a portion of the effluent passing through the screen, means connected with said dehydration vessel to heat the liquid contents thereof to effect drying of fragmentary solids entrained in liquid therein, a filter connected with said dehydration vessel to receive fluid heated in the latter and to filter entrained solids therefrom, a solids washing and settling vessel positioned to receive solids from said screen, a source of clean hot solvent connected to said washing and settling vessel to continuously supply clean hot solvent thereto to maintain therein a body of solvent into which solids from said screen are immersed for drying and washing, liquid conduit means connecting said washing and settling vessel with said distillation vessel to continuously flow solvent to the latter from said washing and settling vessel to determine the upper level of the liquid body in the solids washing and settling vessel and to accommodate the continuous addition of clean solvent to such liquid body, agitating means coacting with said washing and settling vessel to continuously agitate the upper portion of the liquid body in the latter, and a conveyor connected with the bottom of said washing and settling vessel to receive fragmentary solids settling therein and carry such solids away for further processing.

10. An apparatus for producing fat and nutritious defatted and dehydrated solids from fatty biological material having a substantial moisture content, comprising, a distillation vessel adapted to contain a boiling body of liquid solvent, solvent supply means connected to said distillation vessel to supply solvent thereto, biological material fragmentizing means positioned to produce and supply fragmentized biological material substantially continuously to said distillation vessel to be immersed within a body of solvent therein, said distillation vessel having heating means for transferring heat to a body of solvent therein to effect boiling of such body, vapor collecting means coacting with said distillation vessel to collect azeotropic vapors distilled from the body of solvent boiled within the distillation vessel, a condenser connected with said azeotrope collecting means to condense azeotropic vapors collected by the latter, a screen for separating solids from liquid, flow means communicating with the interior of said distillation vessel and said screen to continuously flow liquid and entrained solids from said distillation vessel to the screen to screen entrained solids from the flowing liquid, liquid collecting means coacting with said screen and connected with said distillation vessel to return to the boiling body of liquid in the latter liquid effluent passing through the screen, a solids washing and settling vessel positioned to receive solids from said screen, a source of clean hot solvent connected to said washing and settling vessel to continuously supply clean hot solvent thereto to maintain therein a body of solvent into which solids from said screen are immersed for drying and washing, liquid withdrawing means connected to said washing and settling vessel continuously to withdraw liquid from the latter to determine the upper level of the liquid body therein and to accommodate the continuous addition of clean solvent to such liquid body, and conveying means connected with the bottom of said washing and settling vessel to receive fragmentary solids settling therein and carry such solids away for further processing.

11. The process of producing fat and nutritious defatted and dehydrated solids from fatty biological material having a substantial moisture content, comprising fragmentizing the biological material into multitudinous fragments, providing in a distillation vessel a bath of liquid solvent capable of removing water from the biological material and forming therewith an azeotrope and capable of removing fat from the biological material and forming therewith a fluent mixture of fat and solvent, introducing the fragmentized biological material into the solvent bath within the distillation vessel to form a fluent slurry therein, continuously heating the slurry within the vessel to distill off azeotrope formed by the solvent and water removed from the biological material by the solvent and to form in the slurry bath within the distillation vessel a fluent miscella of solvent and fat removed from the biological material by the solvent, collecting and condensing the azeotrope distilled off from the distillation vessel; circulating a flow of fluent miscella through a complete circuit path extending from the slurry bath within the distillation vessel to a solids separator, isolated from the slurry bath within the distillation vessel, to carry entrained solids to the separator and continuing from the solids separator back to the slurry bath in the distillation vessel for carrying on the removal of water and fat from the fragmentized biological material in the bath with ongoing recirculation of the fluent miscella through said circuit path; separating from the fluent miscella circulated through the solids separator at least a major portion of the solids entrained in such circulating miscella and being residues of the biological material fragments immersed in the solvent bath; further processing the residue solids separated by the solids separator from the circulating miscella to remove from such solids residual water, fat and solvent; and drawing off a fluent miscella of solvent and fat from the distillation vessel for recovery of fat from such drawn off miscella.

References Cited
UNITED STATES PATENTS

| | | | |
|---|---|---|---|
| 3,538,973 | 11/1970 | Levin | 99—208 |
| 1,934,677 | 11/1933 | Ash | 203—14 |
| 2,273,557 | 2/1942 | Bonotto | 202—169 |
| 2,503,312 | 4/1950 | Worsham et al. | 99—157 |
| 2,539,544 | 1/1951 | Levin et al. | 99—208 |
| 2,619,425 | 11/1952 | Levin | 203—14 |
| 2,752,377 | 6/1956 | McDonald | 260—412.8 |
| 2,916,142 | 12/1959 | Fontein | 209—274 |
| 3,451,828 | 6/1969 | Baer et al. | 99—208 |
| 3,509,933 | 5/1970 | Levin | 202—175 |
| 3,535,354 | 10/1970 | Karnofsky | 202—169 |

WILBUR L. BASCOMB, JR., Primary Examiner

U.S. Cl. X.R.

203—14, 67, 43, 69; 202—169, 175; 99—199, 204, 208, 209, 246, 17, 18; 260—412.8; 209—10, 274